US012730261B2

(12) United States Patent
Marin et al.

(10) Patent No.: US 12,730,261 B2
(45) Date of Patent: Sep. 8, 2026

(54) PILLAR STRUCTURES ON AN OPTICAL WAVEGUIDE

(71) Applicant: Intel Corporation, Santa Clara, CA (US)

(72) Inventors: Brandon C. Marin, Gilbert, AZ (US); Gang Duan, Chandler, AZ (US); Jeremy D. Ecton, Gilbert, AZ (US); Suddhasattwa Nad, Chandler, AZ (US); Srinivas V. Pietambaram, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 17/956,757

(22) Filed: Sep. 29, 2022

(65) Prior Publication Data

US 2024/0111092 A1 Apr. 4, 2024

(51) Int. Cl.

| | |
|---|---|
| ***G02B 6/12*** | (2006.01) |
| ***G02B 5/00*** | (2006.01) |
| ***G02B 6/122*** | (2006.01) |
| ***G02B 6/13*** | (2006.01) |
| *F21V 8/00* | (2006.01) |

(52) U.S. Cl.

CPC ........... *G02B 6/1226* (2013.01); *G02B 5/008* (2013.01); *G02B 6/122* (2013.01); *G02B 6/13* (2013.01); *G02B 6/0016* (2013.01)

(58) Field of Classification Search

CPC .............................. G02B 6/1226; G02B 5/008

See application file for complete search history.

(56) References Cited

U.S. PATENT DOCUMENTS

| | | | | |
|---|---|---|---|---|
| 4,906,063 A * | 3/1990 | Sato | G02B 6/122 | 385/37 |
| 5,138,687 A * | 8/1992 | Horie | G02B 6/1245 | 385/129 |
| 11,221,442 B2 * | 1/2022 | Lu | G02F 1/133605 | |
| 2006/0238767 A1 * | 10/2006 | Chen | G01N 21/7743 | 356/445 |
| 2011/0091157 A1 * | 4/2011 | Yao | G02B 6/13 | 385/39 |

(Continued)

FOREIGN PATENT DOCUMENTS

KR 10-2020-0088718 A * 7/2020

OTHER PUBLICATIONS

X. Guo et al. Molding free-space light with guided wave-driven metasurfaces. Science Advances, Jul. 17, 2020 (https://doi.org/10.1126/sciadv.abb4142) (Year: 2020).*

*Primary Examiner* — Michael Stahl

(74) *Attorney, Agent, or Firm* — Schwabe, Williamson & Wyatt, P.C.

(57) ABSTRACT

Embodiments herein relate to systems, apparatuses, techniques for an optical waveguide that includes a plurality of pillar structures that are in an optical path between the optical waveguide and a PIC. In embodiments, the plurality of pillar structures form an evanescent coupling structure that increases the alignment tolerance between the PIC and the optical waveguide. In embodiments, an end of each of the plurality of pillar structures may include a mass of material, such as gold, silver, or copper, that light from the PIC interacts with in a Plasmon effect to focus the light on to the optical waveguide. Other embodiments may be described and/or claimed.

25 Claims, 11 Drawing Sheets

(56) References Cited

U.S. PATENT DOCUMENTS

| | | | | |
|---|---|---|---|---|
| 2012/0075699 | A1* | 3/2012 | Davis | G02B 5/3058 359/492.01 |
| 2013/0272652 | A1* | 10/2013 | Yaacobi | G02B 6/124 385/27 |
| 2015/0316718 | A1* | 11/2015 | Fattal | G02B 6/136 385/14 |
| 2016/0158724 | A1* | 6/2016 | Chang | B81C 1/00468 29/458 |
| 2016/0195676 | A1* | 7/2016 | Yu | G02B 6/107 385/11 |
| 2017/0284609 | A1* | 10/2017 | Hirasawa | H10H 20/8514 |
| 2019/0243064 | A1* | 8/2019 | Menezo | G02B 6/136 |
| 2020/0192108 | A1* | 6/2020 | Godet | G02B 6/132 |
| 2021/0382371 | A1* | 12/2021 | Ni | G02F 1/2955 |
| 2023/0341623 | A1* | 10/2023 | Marin | G02B 6/1226 |

* cited by examiner

PILLAR STRUCTURES ON AN OPTICAL WAVEGUIDE

FIELD

Embodiments of the present disclosure generally relate to the field of package assemblies, and in particular to photonics packages.

BACKGROUND

Continued reduction in end product size of mobile electronic devices such as smart phones and ultrabooks is a driving force for the development of reduced size system in photonics components within a package. In embodiments, quality of photonics components may be improved by forming the components in situ.

DETAILED DESCRIPTION

Figure 1:
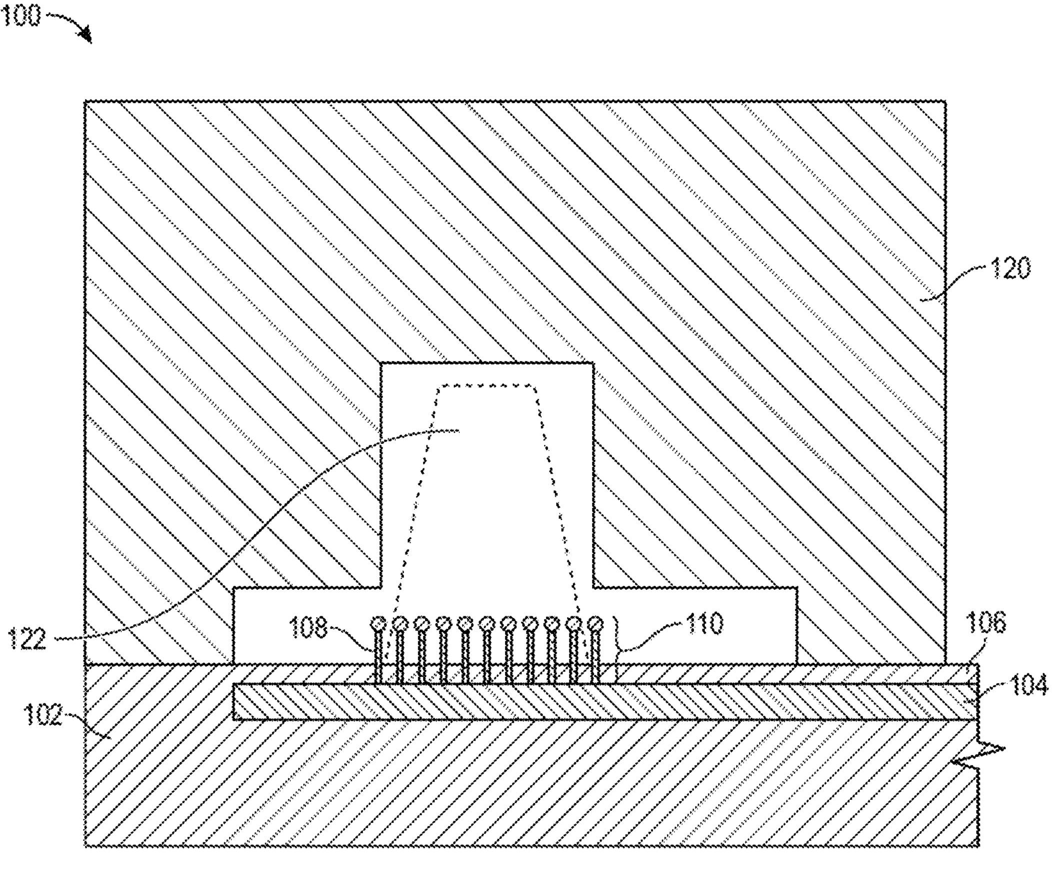
FIG. 1 illustrates a cross-section side view of a partial photonics package that includes a photonics integrated circuit (PIC) that is optically coupled with an optical waveguide on a substrate using a plurality of pillar structures on the optical waveguide for evanescent optical coupling, in accordance with various embodiments.

Embodiments of the present disclosure may generally relate to systems, apparatus, techniques, and/or processes directed to an optical waveguide that includes a plurality of pillar structures, where at least a portion of the plurality of pillar structures are in an optical path between the optical waveguide and a PIC. In embodiments, a pillar structure may be pillar shaped nanostructures that may be grouped together. In embodiments, pillar structures may be on the order of 1-100 nm in diameter. In embodiments, pillar structures may be grouped together in lattice-like arrays.

In embodiments, the plurality of pillar structures form an evanescent coupling structure that increases the alignment tolerance between the PIC and the optical waveguide. In embodiments, an end of each of the plurality of pillar structures may include a mass, which may be a material such as gold, silver, or copper, that light from the PIC interacts within a Plasmon effect to focus the light onto the optical waveguide below the plurality of pillar structures. In embodiments, the mass may be referred to as an edge particle, and may take the shape of a ball, oblique spheroid, a crystalline structure, a polyhedra, or some other shape. The mass may also be referred to as a pillar structure top.

In embodiments, the focusing function of the plurality of pillar structures increases evanescent coupling efficiency by allowing lower intensity light that is further away from the main portion of the beam of light between the PIC and the optical waveguide to be captured and redirected toward the waveguide. In embodiments, the plurality of masses, respectively, at the end of each of the plurality of pillar structures may form a localized surface plasma that is used to focus lower intensity light.

In embodiments, the optical waveguide, the pillar structures, and the material at the end of the pillar structures may be manufactured in situ, thereby decreasing cost and manufacturing complexity and increasing quality of the resulting photonics device. Thus, embodiments may result in a photonics device that has better bandwidth at a lower cost. In legacy implementations, most of the components of such a photonics device are fabricated separately and then assembled, which is expensive and introduces reliability issues.

In embodiments described herein, the performance characteristics of evanescent coupling may be tuned by varying a number of factors, including but not limited to the number of pillar structures, the distance between individual pillar structures, the geometry or configuration of the pillar structures, the height of the pillar structures, and the material used at the end of the pillar structures.

In legacy implementations, off package I/O bandwidth has been steadily doubling every two years. Packaging and I/O technologies continue to scale an order to meet this bandwidth demand. As a result, packaging pin counts and I/O data rates continued increase. However, in legacy implementations, an electrical I/O reach, for example the length of electrical printed circuit board (PCB) traces or cables, continues to reduce at increased data rates. Additionally, I/O energy efficiency improvement has drastically slowed, which is resulting in a quickly approaching I/O power wall for high performance packages.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

Various embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

FIG. 1 illustrates a cross-section side view of a partial photonics package that includes a PIC that is optically coupled with an optical waveguide on a substrate using a plurality of pillar structures on the optical waveguide for evanescent optical coupling, in accordance with various embodiments. These pillar structures may be termed "nano-pillars" given that the size of the pillar structures may be measured in terms of nanometers. Partial package 100 is a cross-section side view that includes a substrate 102. In embodiments, the substrate 102 may be a glass substrate. An optical waveguide 104 may be formed on or into the substrate 102. In embodiments, there may be a layer 106 on the optical waveguide 104. In embodiments, the layer 106 may include graphene. In such embodiments, the layer 106 comprises primarily carbon. A plurality of pillar structures 110 may be placed on the optical waveguide 104 and/or the layer 106. The plurality of pillar structures 110 may be referred to as an evanescent coupler.

In embodiments, a PIC 120 may be coupled with the substrate 102, and may be optically coupled with the optical waveguide 104 using the plurality of pillar structures 110. During operation, light 122 will be transmitted from the PIC 120 to the optical waveguide 104 as at least a portion of the light 122 passes through the plurality of pillar structures 110. The plurality of pillar structures 110 is made up of individual pillar structures 108. In embodiments, an individual pillar structure 108 has a first end that is coupled with the optical waveguide 104 and a second end opposite the first end.

Figure 2:
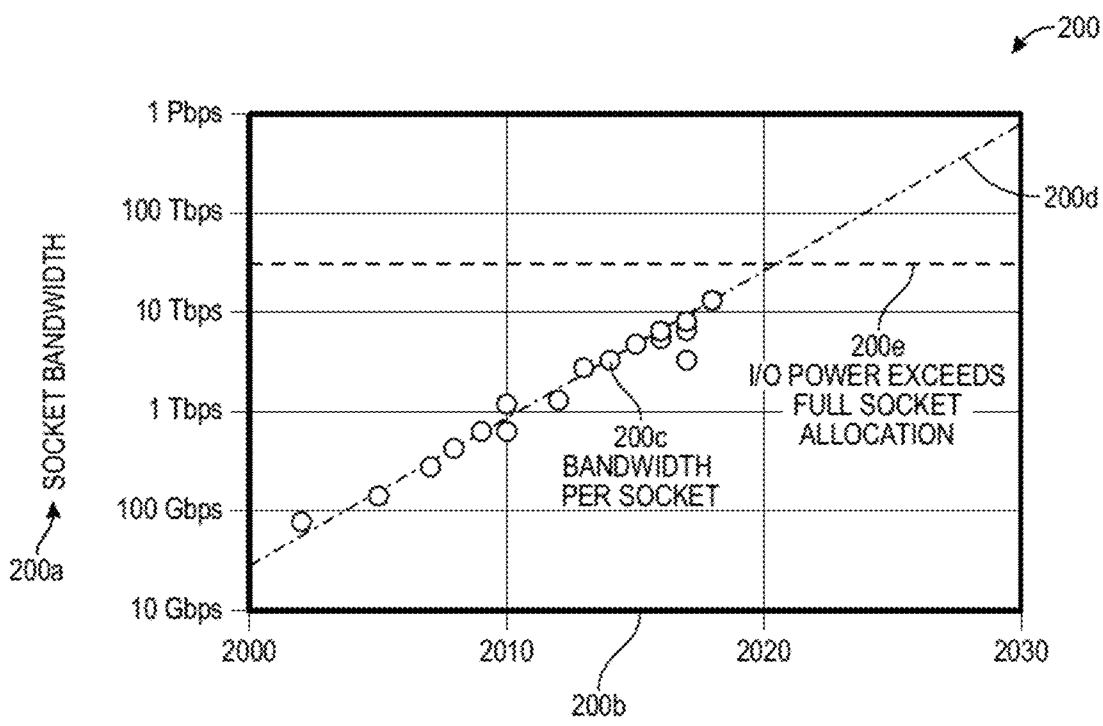
FIG. 2 illustrates legacy issues with socket bandwidth limitation and input/output (I/O) power consumption.
Figure 2:
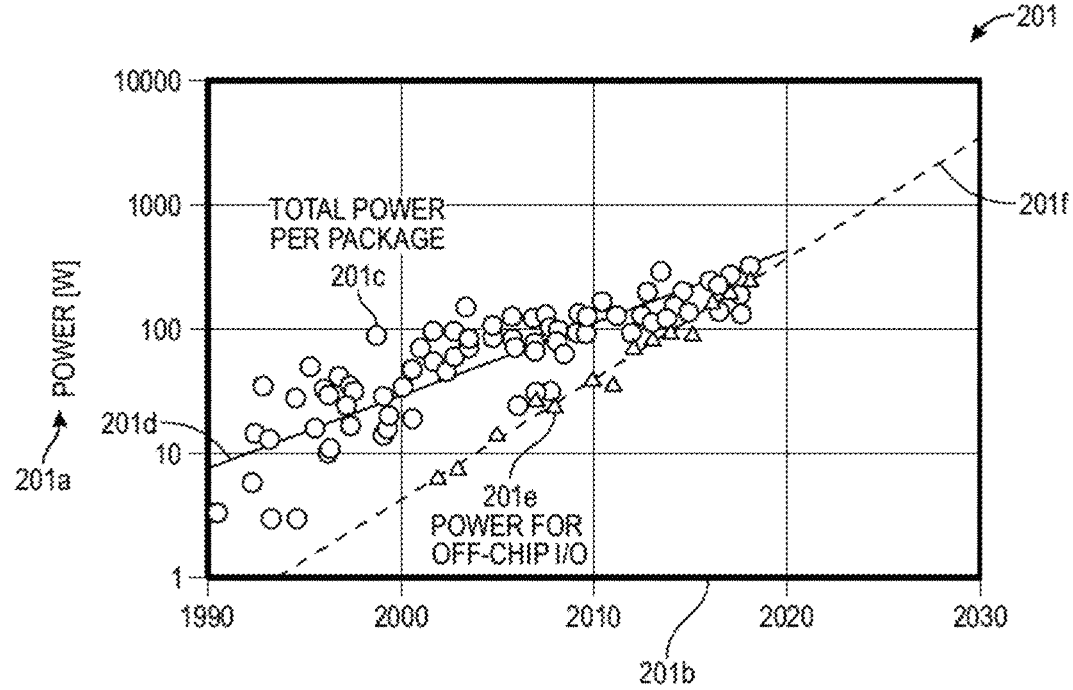

FIG. 2 illustrates legacy issues with socket bandwidth limitation and input/output (I/O) power consumption. Embodiments of the optical waveguide 104 and the plurality of pillar structures 110 described with respect to FIG. 1 may be used to address a legacy issue of semiconductor package I/O limitations in terms of bandwidth, power, latency, and/or reach. Graph 200 shows a logarithmic comparison of socket bandwidth 200*a* on the X axis to years 200*b* on the Y axis. In graph 200, the highest performing central processing units (CPU), field programmable gate arrays (FPGA), graphics processing units (GPU), and application specific integrated circuits (ASIC) were used as part of the analysis with individual data points 200*c* plotted to show the trend line 200*d*. The line 200*e* shows a point where I/O power will exceed the full socket allocation.

Graph 201 shows a logarithmic comparison of power, in watts (W) 201*a* on the X axis to years 201*b* on the Y axis. A first plot on graph 201 shows a trend line of total power per package 201*d* that is calculated using individual data points 201*c*. A second plot on graph 201 shows a trend line of power for off chip I/O 201*f* that is calculated using individual data points 201*e*.

Figure 3:
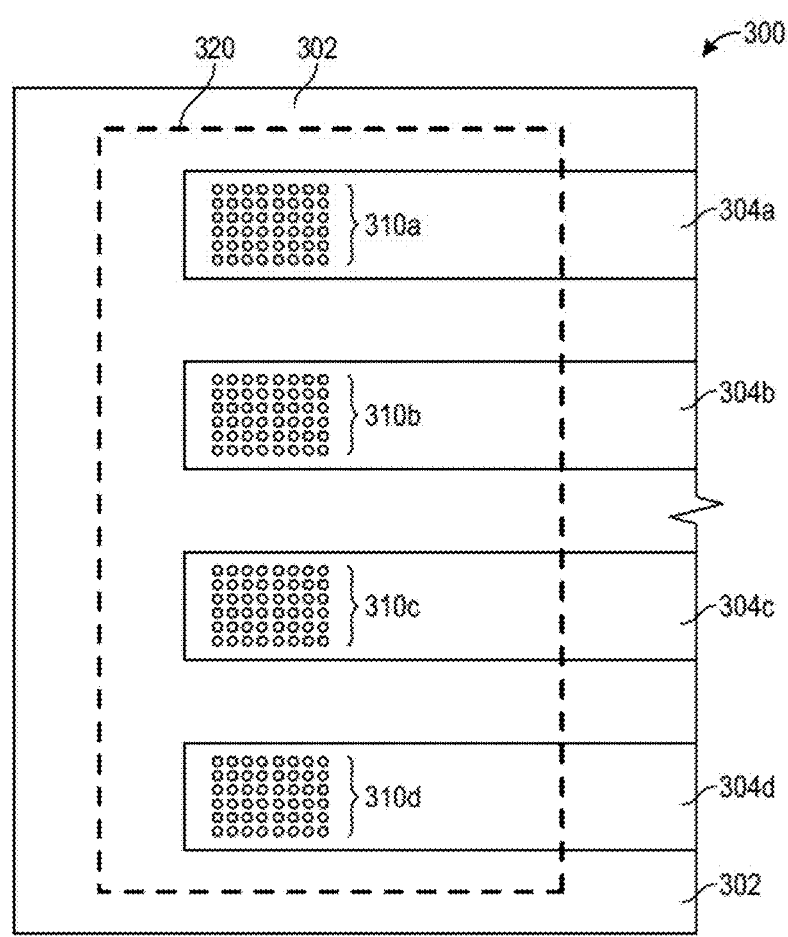
FIG. 3 illustrates a top-down view of a glass substrate that includes a plurality of optical waveguides each with a plurality of pillar structures, in accordance with various embodiments.

FIG. 3 illustrates a top-down view of a glass substrate that includes a plurality of optical waveguides each with a plurality of pillar structures, in accordance with various embodiments. Diagram 300 shows a top-down cross-section view of a glass substrate 302, which includes a plurality of optical waveguides 304*a*, 304*b*, 304*c*, 304*d*, which may be similar to substrate 102 and optical waveguide 104 of FIG. 1.

A plurality of pillar structures 310*a*, 310*b*, 310*c*, 310*d* are respectively on each of the plurality of optical waveguides 304*a*, 304*b*, 304*c*, 304*d*. Outline 320 shows where a PIC, which may be similar to PIC 120 of FIG. 1, may couple with the glass substrate 302 and may optically couple with the plurality of optical waveguides 304*a*, 304*b*, 304*c*, 304*d*.

Figure 4A:
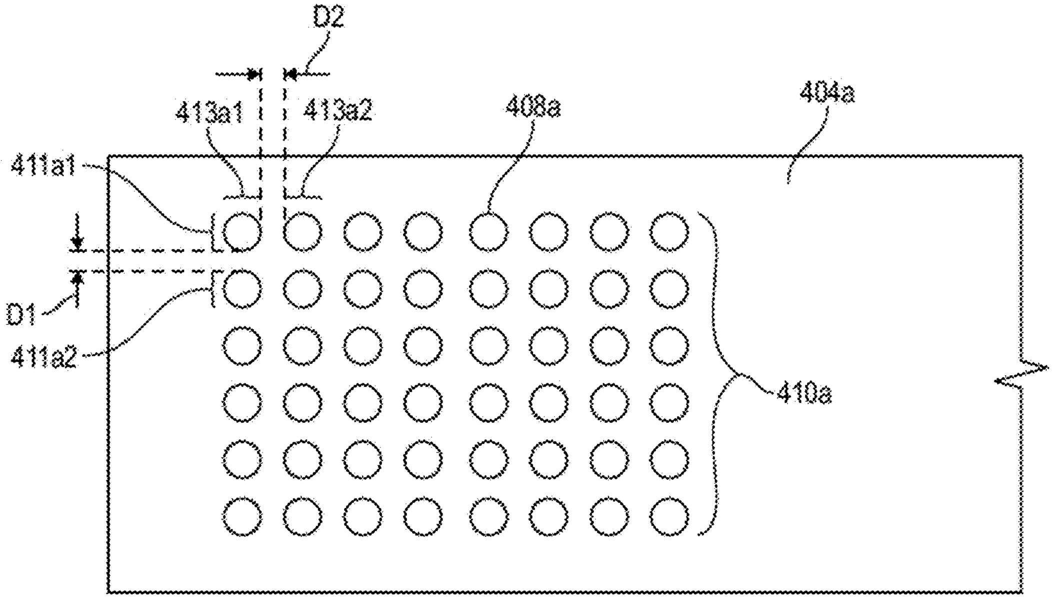
FIGS. 4A-4C illustrate detailed top-down views and a cross-section side view of a plurality of pillar structures in different configurations, in accordance with various embodiments.
Figure 4B:
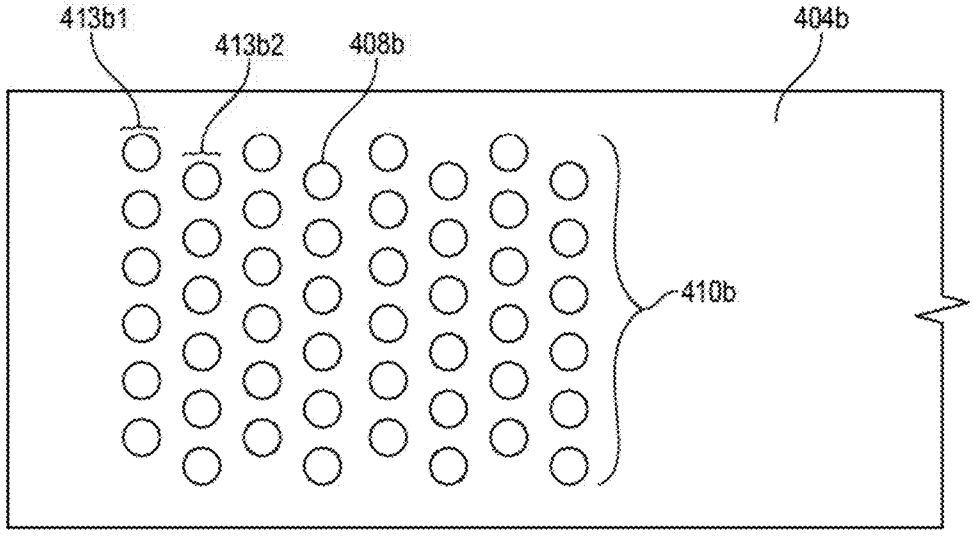
Figure 4C:
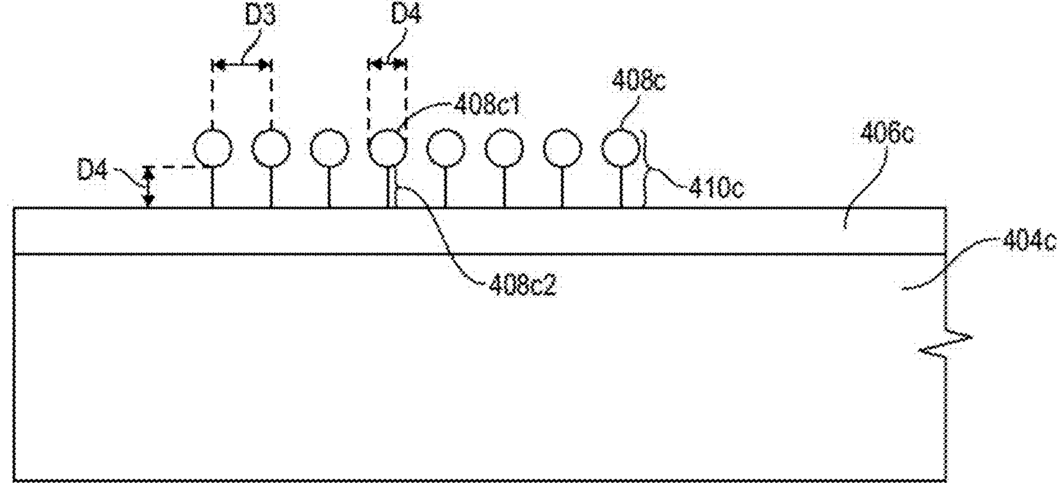

FIGS. 4A-4C illustrate detailed top-down views and a cross-section side view of a plurality of pillar structures in different configurations, in accordance with various embodiments. FIG. 4A shows a top-down view of an optical waveguide 404*a*, which may be similar to optical waveguide 104 FIG. 1, with a plurality of pillar structures 410*a*, which may be similar to plurality of pillar structures 110 of FIG. 1. In embodiments, the plurality of pillar structures 410*a* are in a grid pattern with respect to the optical waveguide 404*a*, and have a plurality of rows, such as row 411*al* and row 411*a*2, and a plurality of columns, such as column 413*a*1 and column 413*a*2. As shown, there may be six rows and eight columns within the plurality of pillar structures 410*a*, which may form a rectangular configuration that forms a region above the optical waveguide 404*a*.

In embodiments, optical characteristics of the plurality of pillar structures 410*a* may be tuned by adjusting various configurations for each of the individual pillar structures 408*a*, which may be similar to individual pillar structures 108 of FIG. 1. For example, a distance between rows, for example a distance D1 between row 411*a*1 and row 411*a*2, may be varied, and a distance between columns, for example a distance D2 between column 413*al* and column 413*b*1 may be varied.

FIG. 4B shows a top-down of another embodiment of a configuration of a plurality of pillar structures 410*b* that are in a staggered configuration on optical waveguide 404*b*. For example, columns 413*b*1, 413*b*2 may be staggered, which may provide more even spacing between individual pillar structures 408*b* as compared to pillar structures 408*a* of FIG. 4A, and may also enable a tighter density of individual pillar structures 408*b* within a region formed by the plurality of pillar structures 410*b* on the optical waveguide 404*b*. FIGS. 4A-4B show just two examples of embodiments of patterns of layouts of pillar structures 408*a*, 408*b*. In embodiments, other layouts may be used.

FIG. 4C shows a side view of a plurality of pillar structures 410*c* that are on a graphene layer 406*c* and an optical waveguide 404*c*, which may be similar to pillar structures 110, layer 106, and optical waveguide 104 of FIG. 1. Optical characteristics of the plurality of pillar structures 410*c* may be tuned by adjusting other configurations for each of the individual pillar structures 408*c*. In embodiments, a distance D3 may be varied between individual pillar structures 408*c*.

In embodiments, an individual pillar structure 408*c* may include a pillar structure top 408*c*1 and a pillar structure shaft 408*c*2. In embodiments, a dimension D4 of a pillar structure top 408*cl* may be varied. In embodiments, a shape of a pillar structure top 408*c*1 may be varied, for example a spheroid shape, a polyhedra shape, or an irregular shape. In embodiments, a distance between a pillar structure top 408*c*1 and a surface of the graphene layer 406*c* or a surface of the optical waveguide 404*c* along pillar structure shaft 408*c*2 may be varied. In embodiments, the pillar structure top 408*c*1 may be referred to as a mass.

Figure 5A:
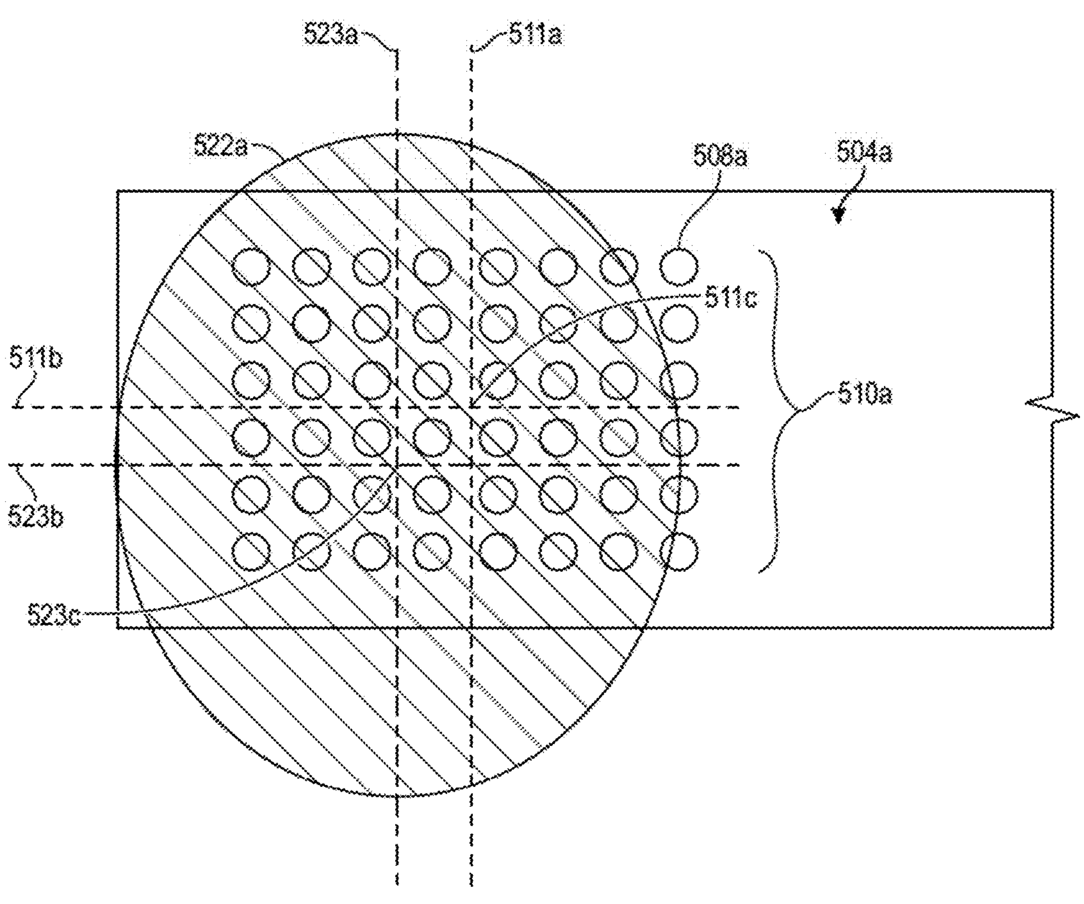
FIGS. 5A-5C illustrate a detailed top-down view and cross-section side view of light interacting with a plurality of pillar structures, and a cross-section side view of a pillar structure that shows electronic field enhancements as light comes into contact with a top of the pillar structure, in accordance with various embodiments.
Figure 5B:
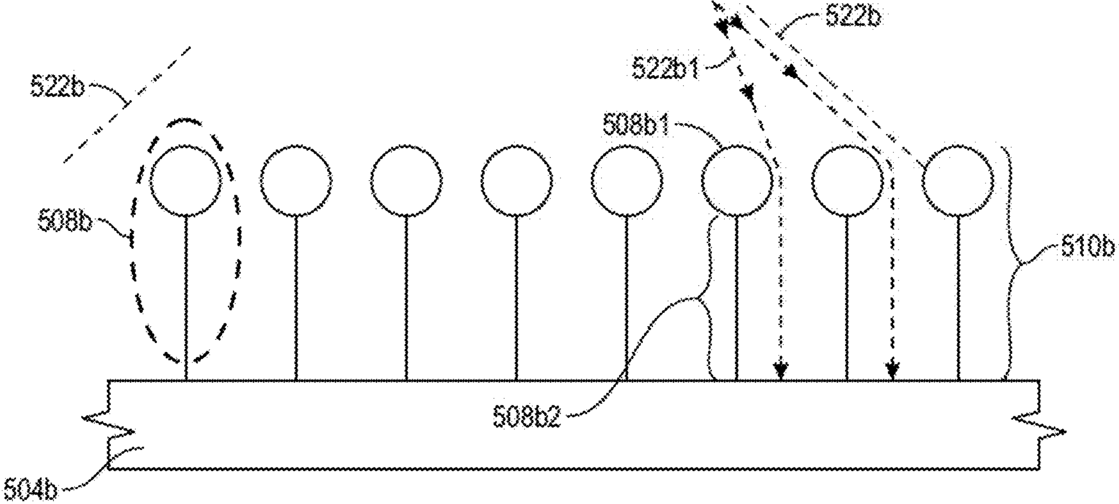
Figure 5C:
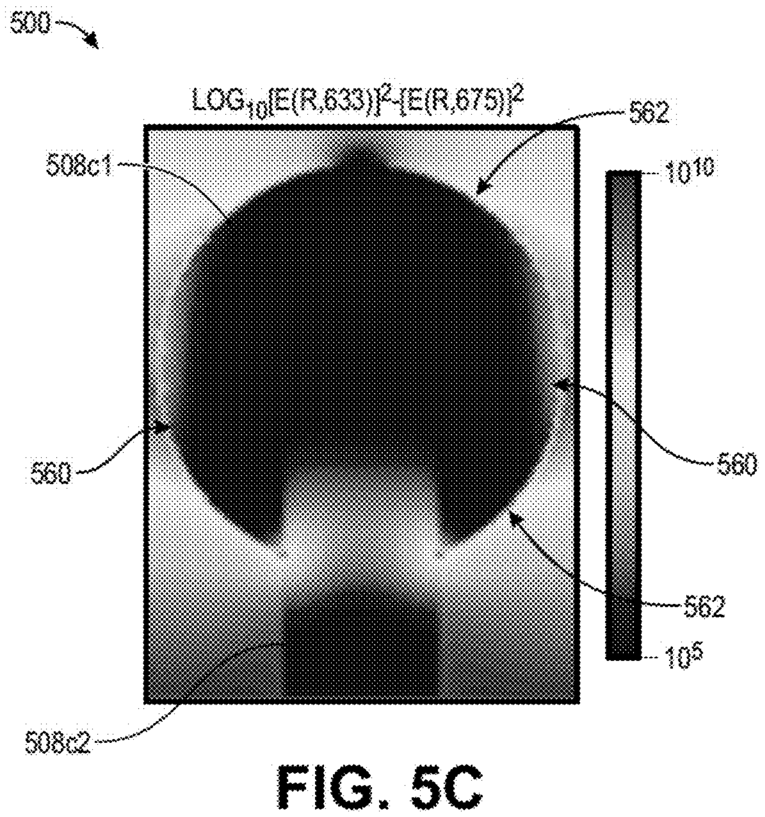

FIGS. 5A-5C illustrate a detailed top-down view and cross-section side view of light interacting with a plurality of pillar structures, and a cross-section side view of a pillar structure that shows electronic field enhancements as light comes into contact with a top of the pillar structure, in accordance with various embodiments. FIG. 5A shows a top-down view of the optical waveguide 504*a* that includes a plurality of pillar structures 510*a* that include individual pillar structures 508*a*, which may be similar to optical waveguide 104, plurality of pillar structures 110, and individual pillar structures 108 of FIG. 1. Dashed line 511*a* represents a Y centerline of the plurality of pillar structures 510*a* and dashed line 511*b* represents an X centerline of the plurality of pillar structures 510*a*, where center point 511*c* represents the center of the plurality of pillar structures 510*a*.

Light 522*a*, which may be similar to light 122 of FIG. 1, is transmitted down from a PIC, (not shown but may be similar to PIC 120 of FIG. 1). In embodiments, the light 522*a* may have a cross-section that is an oval as shown. In other embodiments, the cross-section of the light 522*a* may be some other shape. Line 523*a* represents a Y centerline of the light 522*a* and line 523*b* represents an X centerline of the light 522*a*, where center point 523*c* represents the center of the light 522*a*.

In ideal manufacturing situations, the light 522*a* and the plurality of pillar structures 510*a* would be completely aligned. However, what is typical and is shown in this embodiment, the light 522*a* is misaligned with respect to the plurality of pillar structures 510*a*. This may be, for example, due to a misalignment of the placement of the PIC (not shown but may be similar to PIC 120 of FIG. 1), over the plurality of pillar structures 510*a* during a stage in the manufacturing process. In embodiments, an intensity of the light 522*a* may be higher toward center point 523*c* of the light 522*a* and may become weaker toward the edges of the light 522*a*.

Embodiments may result in a higher alignment tolerance between the light 522*a* and the plurality of pillar structures 510*a* as compared to legacy implementations. For example, using a legacy direct optical coupling technique, a tolerance in the X direction, along the line 523*a*, is on the order of 1.1 μm, and a tolerance in the Y direction, along the line 523*b*, is on the order of 1.1 μm. A Z tolerance, orthogonal to the optical waveguide 504*a*, is on the order of 1.1 μm. In another example, using a legacy evanescent optical coupling technique, a tolerance in the X direction, along the line 523*a*, is on the order of 1000 μm, and a tolerance in the Y direction, along the line 523*b*, is on the order of 2 μm. A Z tolerance, orthogonal to the optical waveguide 504*a*, is less than 1.5 μm. However, in embodiments described herein using evanescent coupling pillar structures, a tolerance in the X direction, along the line 523*a*, is on the order of 1500 μm, and a tolerance in the Y direction, along the line 523*b*, is on the order of 10 μm. A Z tolerance, orthogonal to the optical waveguide 504*a*, is on the order of 8 μm.

FIG. 5B shows an enlarged cross-section side view of a plurality of pillar structures 510*b* that includes individual pillar structures 508*b* that are on an optical waveguide 504*b*, which may be similar to plurality of pillar structures 510*a*, individual pillar structures 508*a* and optical waveguide 504*a* of FIG. 5A. In embodiments, pillar structure 508*b* includes a pillar structure top 508*b*1 and a pillar structure shaft 508*b*2, which may be similar to pillar structure top 408*c*1 and a pillar structure shaft 408*c*2 of FIG. 4C.

In embodiments, the pillar structure top 508*b*1 may be made of a material that may include gold, silver, aluminum, palladium, nickel, or copper. In embodiments, the pillar structure top 508*b*1 may have a spheroid shape, a polyhedra shape, or an irregular shape. During operation, as an individual ray of light 522*b*1, particularly toward and edge of the of the light 522*b*, travels toward the plurality of pillar structures 510*b*, the ray of light 522*b*1 will encounter a surface of the pillar structure top 508*b*1 and refract toward the optical waveguide 504*b*.

In embodiments, when the ray of light 522*b*1 encounters the surface of the pillar structure top 508*b*1, a localized surface plasma may form on the surface of the pillar structure top 508*b*1 as conduction electrons on the surface of the pillar structure top 508*b*1 oscillate under the presence of an enhanced electric field. In this way, the plurality of pillar structures 510*b* act as an antenna or as a lens to focus the light 522*b* onto the optical waveguide 504*b*.

In embodiments, the material chosen for the pillar structure top 508*b*1 may be based on the characteristic of wavelengths of the light 522*b*. For example, gold may absorb light in the middle of the UV/visible range, silver may absorb light more in the UV range, and copper may absorb light in the infrared range.

FIG. 5C is an image 500 of an example of electronic field enhancement around the pillar structure top 508*c*1 that is on the pillar structure shaft 508*c*2, which may be similar to pillar structure top 508*b*1 and pillar structure shaft 508*b*2. As rays of light, such as ray of light 522*b*1, encounters the pillar structure top 508*c*1, higher energy areas 560 and lower intensity energy areas 562 may be formed around the pillar structure top 508*c*1, as indicated by the gradients.

Figure 6A:
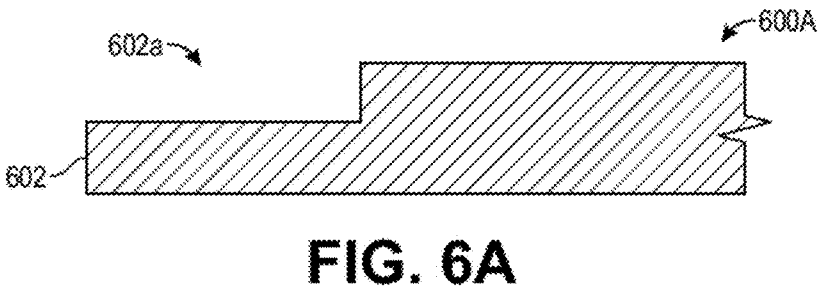
FIGS. 6A-6D illustrate cross-section side views of stages in a manufacturing process for creating a partial photonics package that includes pillar structures on an optical waveguide, in accordance with various embodiments.

FIGS. 6A-6D illustrate cross-section side views of stages in a manufacturing process for creating a partial photonics package that includes pillar structures on an optical waveguide, in accordance with various embodiments. FIG. 6A is a cross-section side view of a stage in the manufacturing process where diagram 600A shows that a substrate 602 may be provided. The substrate 602 may include one or more cavities 602*a* within a substrate 602. In embodiments, the substrate may include glass. In embodiments, the substrate 602 may be part of a glass core of another substrate (not shown).

Figure 6B:
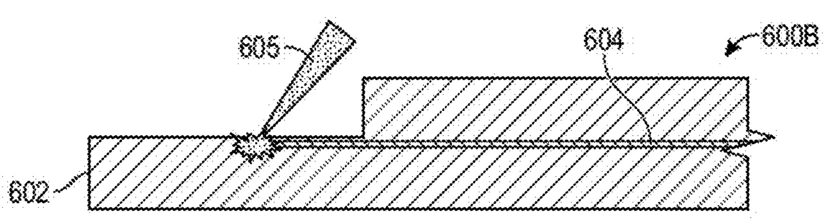

FIG. 6B illustrates a cross-section side view of a stage in the manufacturing process where diagram 600B shows that an optical waveguide 604, which may be similar to optical waveguide 104 of FIG. 1 is formed within or on a surface of the substrate 602. In embodiments, a laser direct writing 605 process may be used. In embodiments, an ion exchange, an ion implementation, or a ultraviolet (UV) writing process may be used to form the optical waveguide 604 through glass index modification. In embodiments (not shown) a graphene layer that primarily comprises carbon, such as layer 106 of FIG. 1 may be placed on the optical waveguide 604.

Figure 6C:
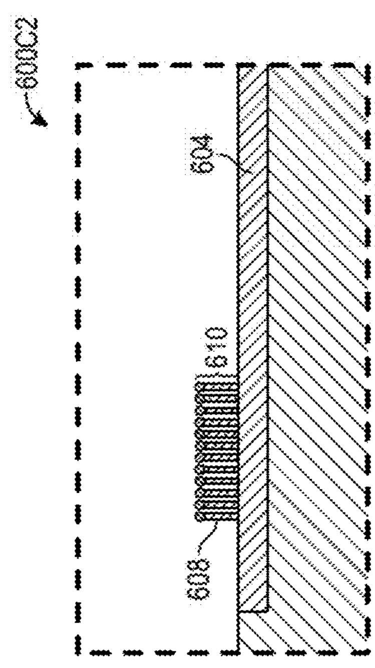
Figure 6C:
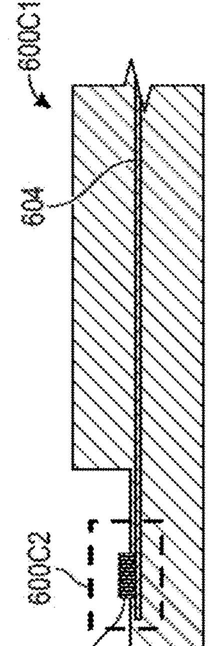

FIG. 6C illustrates a cross-section side view of a stage in the manufacturing process where diagram 600C1 shows a plurality of pillar structures 610, which may be similar to plurality of pillar structures 110 of FIG. 1, are formed on the optical waveguide 604. Diagram 600C2 shows an expanded view of the optical waveguide 604 and the plurality of pillar structures 610, made up of individual pillar structures 608, which may be similar to individual pillar structures 108 of FIG. 1. In embodiments, the construction of the plurality of pillar structures is shown in greater detail with respect to FIGS. 7A-7D.

Figure 6D:
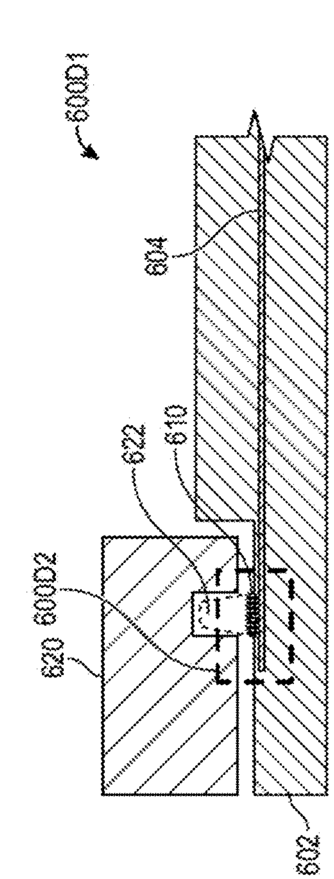

FIG. 6D illustrates a cross-section side view of a stage in the manufacturing process where diagram 600D1 shows a PIC 620, which may be similar to PIC 120 of FIG. 1, that is coupled with the substrate 602, and is optically coupled with the plurality of pillar structures 610. In embodiments during operation, light 622, which may be similar to light 122 of FIG. 1, from the PIC 620 may encounter the plurality of pillar structures 610 to focus the light 622 onto the optical waveguide 604. Diagram 600D2 shows an expanded view where the light 622 interacts with individual pillar structures 608 as described with respect to FIGS. 5A-5C.

Figures 7A, 7B:
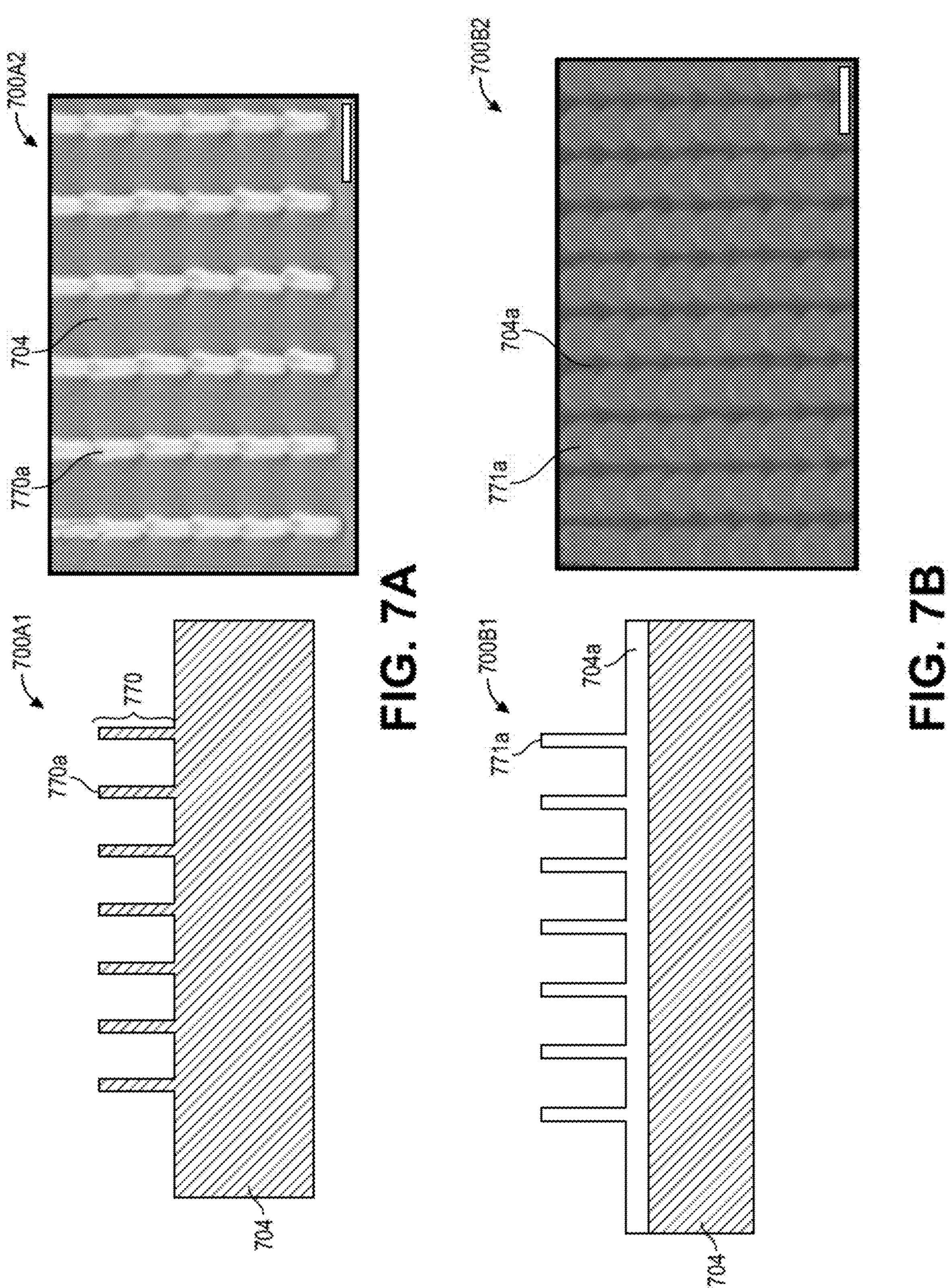
FIGS. 7A-7D illustrate cross-section side views and prospective views of stages in a manufacturing process for creating pillar structures on an optical waveguide, in accordance with various embodiments.

FIG. 7A-7D illustrate cross-section side views and prospective views of stages in a manufacturing process for creating pillar structures on an optical waveguide, in accordance with various embodiments. FIG. 7A shows diagram 700A1 that is a cross-section side view, and diagram 700A2 that is a prospective view of a stage in the manufacturing process where a plurality of pillars 770 are formed on a surface of an optical waveguide 704. The plurality of pillars 770 include of individual pillars 770*a*. In embodiments, the optical waveguide 704 may be similar to optical waveguide 104 of FIG. 1. In embodiments, the pillars 770 may be formed using a Bosch process on silicon.

FIG. 7B shows diagram 700B1 that is a cross-section side view, and diagram 700B2 that is a prospective view of a stage in the manufacturing process where heat is applied in order to create a layer of silicon oxide 704*a* on the optical waveguide 704, where the heat creates pillars 771*a* that are a silicon oxide.

Figures 7C, 7D:
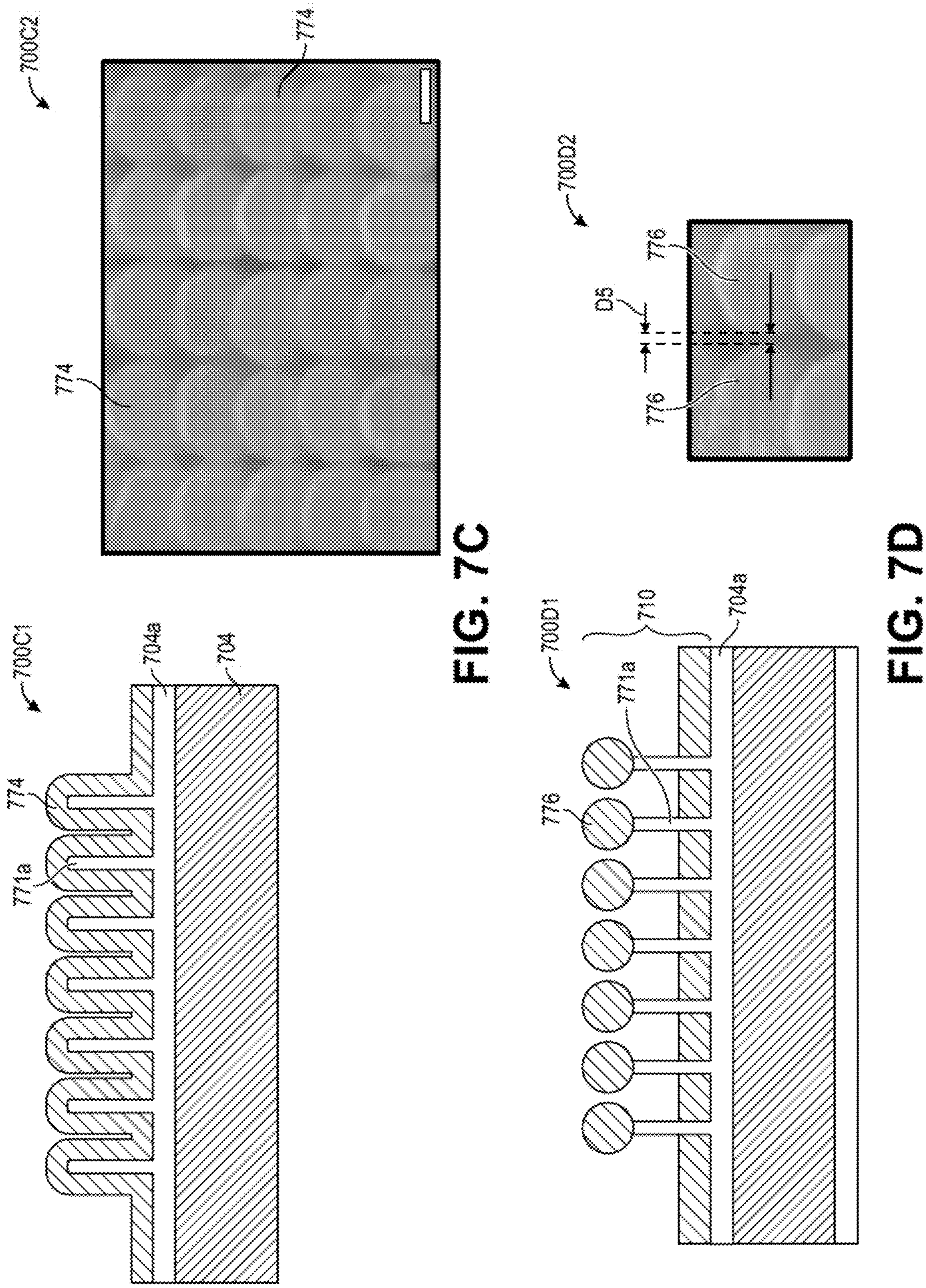

FIG. 7C shows diagram 700C1 that is a cross-section side view, and diagram 700C2 that is a prospective view of a stage in the manufacturing process that includes applying a layer of material 774 on the pillars 771*a* of silicon oxide and on the surface of the layer of silicon oxide 704*a* on the optical waveguide 704. In embodiments, the material 774 may be applied using a sputtering process. In embodiments, the material 774 may include gold, silver, or copper.

FIG. 7D shows diagram 700D1 that is a cross-section side view, and diagram 700D2 that is a prospective view of a stage in the manufacturing process where a heating process occurs that causes the material 774 of FIG. 7C to bead up due to surface tension to separate from the layer of silicon oxide 704*a* and form a mass 776 at a top of the pillars 771*a* of silicon oxide, where the mass 776 is distal to the optical waveguide 704. As a result, a plurality of pillar structures 710, which may be similar to the plurality of pillar structures 110 of FIG. 1, may be formed. In embodiments, the masses 776 may be separated from each other by a distance D5. In embodiments, the masses 776 may be similar to pillar structure top 408*c*1 of FIG. 4C.

In embodiments, the distance D5 may be determined based upon the composition of the material 774, and the heat used. The distance D5 may be adjusted in order to tune the focusing characteristics of the plurality of pillar structures 710. In embodiments, the heating process may be referred to as a reflow process, where the temperature may range from 200° C. to 600° C. under the presence of a forming gas (not shown). The forming gas can be either hydrogen or molecular helium.

Figure 8:
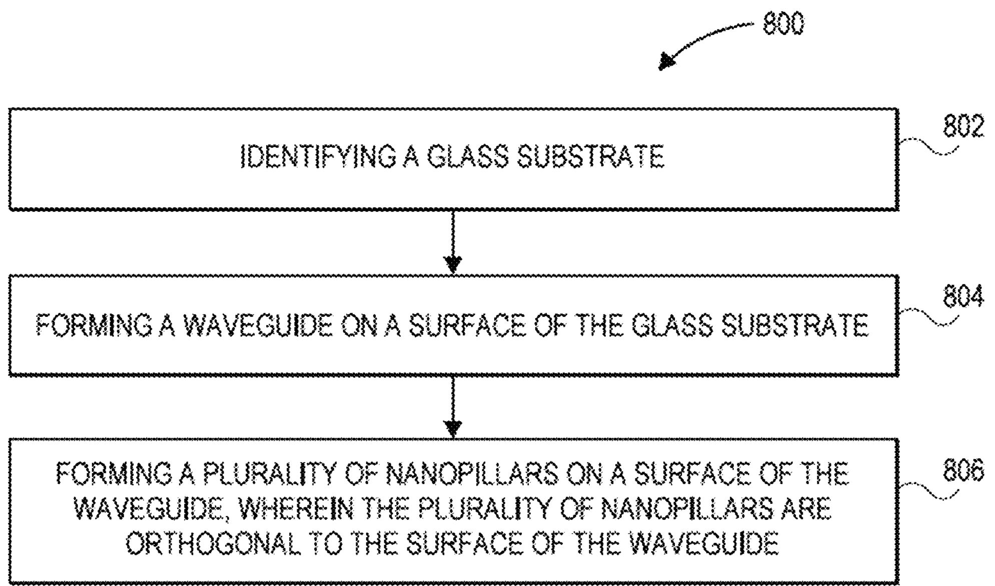
FIG. 8 illustrates an example of a process for creating pillar structures on an optical waveguide, in accordance with various embodiments.

FIG. 8 illustrates an example of a process for creating pillar structures on an optical waveguide, in accordance with various embodiments. Process 800 may be performed using the apparatus, systems, processes, and/or techniques described herein, and particular with respect to FIGS. 1-7D.

At block 802, the process may include identifying a glass substrate. In embodiments, the glass substrate may be similar to substrate 102 of FIG. 1, glass substrate 302 of FIG. 3, or substrate 602 of FIG. 6A.

At block 804, the process may further include forming a waveguide on a surface of the glass substrate. In embodiments, the waveguide may be similar to optical waveguide 104 of FIG. 1, optical waveguides 304*a*, 304*b*, 304*c*, 304*d* of FIG. 3, optical waveguides 404*a*, 404*b*, 404*c* of FIGS. 4A-4C, optical waveguides 504*a*, 504*b* of FIGS. 5A-5B, optical waveguide 604 of FIGS. 6A-6D, or optical waveguide 704 of FIGS. 7A-7C.

At block 806, the process may further include forming a plurality of pillar structures on a surface of the waveguide, wherein the plurality of pillar structures are orthogonal to the surface of the waveguide. In embodiments, the plurality of pillar structures may be similar to plurality of pillar structures 110 of FIG. 1, plurality of pillar structures 310*a*, 310*b*, 310*c*, 310*d* of FIG. 3, plurality of pillar structures 510*a*, 510*b* of FIGS. 5A-5B, plurality of pillar structures 610 of FIGS. 6C-6D, or plurality of pillar structures 710 of FIG. 7D.

Figure 9:
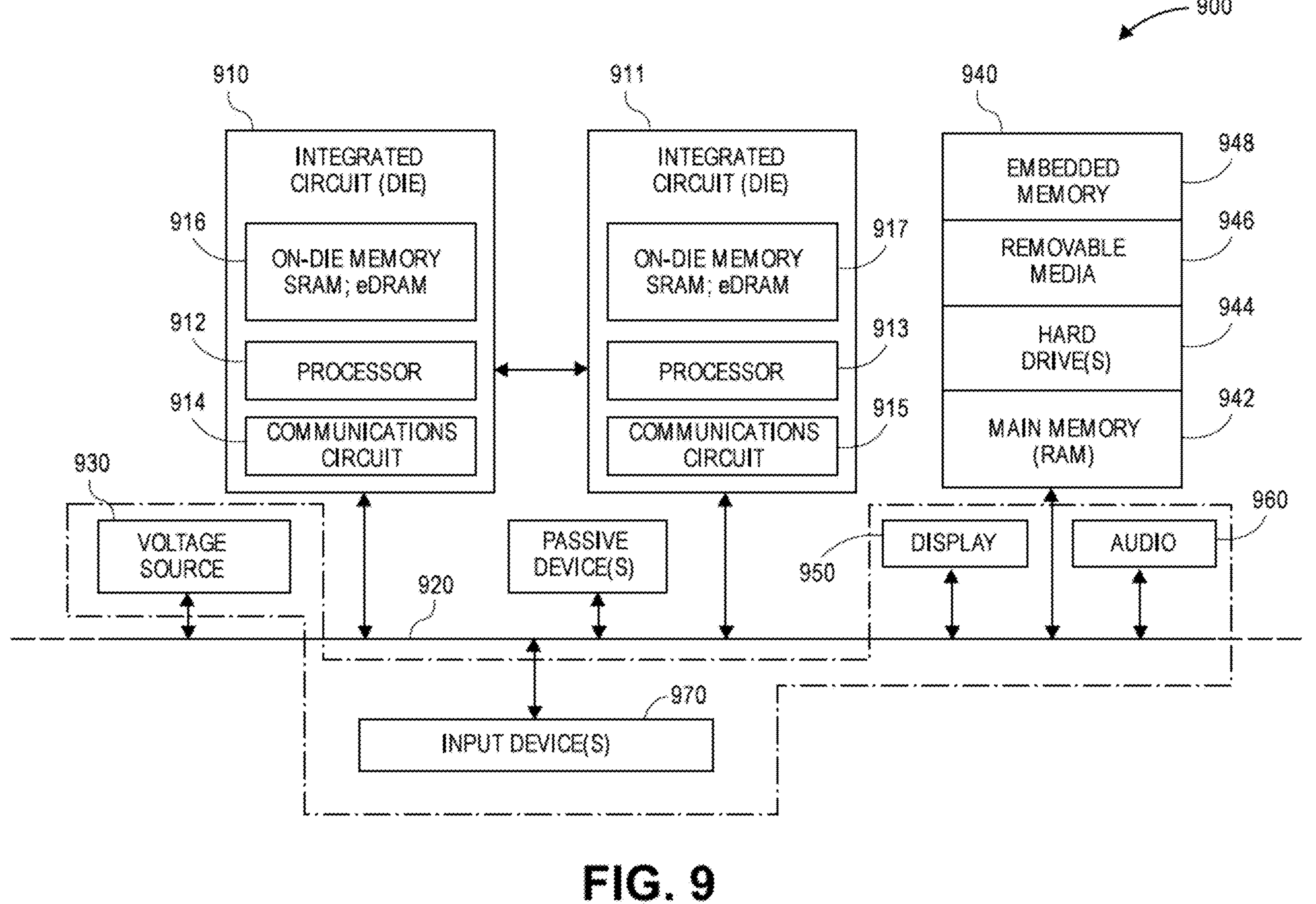
FIG. 9 schematically illustrates a computing device, in accordance with various embodiments.

FIG. 9 is a schematic of a computer system 900, in accordance with an embodiment of the present invention. The computer system 900 (also referred to as the electronic system 900) as depicted can embody pillar structures on an optical waveguide, according to any of the several disclosed embodiments and their equivalents as set forth in this disclosure. The computer system 900 may be a mobile device such as a netbook computer. The computer system 900 may be a mobile device such as a wireless smart phone. The computer system 900 may be a desktop computer. The computer system 900 may be a hand-held reader. The computer system 900 may be a server system. The computer system 900 may be a supercomputer or high-performance computing system.

In an embodiment, the electronic system 900 is a computer system that includes a system bus 920 to electrically couple the various components of the electronic system 900. The system bus 920 is a single bus or any combination of busses according to various embodiments. The electronic system 900 includes a voltage source 930 that provides power to the integrated circuit 910. In some embodiments, the voltage source 930 supplies current to the integrated circuit 910 through the system bus 920.

The integrated circuit 910 is electrically coupled to the system bus 920 and includes any circuit, or combination of circuits according to an embodiment. In an embodiment, the integrated circuit 910 includes a processor 912 that can be of any type. As used herein, the processor 912 may mean any type of circuit such as, but not limited to, a microprocessor, a microcontroller, a graphics processor, a digital signal processor, or another processor. In an embodiment, the processor 912 includes, or is coupled with, pillar structures on an optical waveguide, as disclosed herein. In an embodiment, SRAM embodiments are found in memory caches of the processor. Other types of circuits that can be included in the integrated circuit 910 are a custom circuit or an application-specific integrated circuit (ASIC), such as a communications circuit 914 for use in wireless devices such as cellular telephones, smart phones, pagers, portable computers, two-way radios, and similar electronic systems, or a communications circuit for servers. In an embodiment, the integrated circuit 910 includes on-die memory 916 such as static random-access memory (SRAM). In an embodiment, the integrated circuit 910 includes embedded on-die memory 916 such as embedded dynamic random-access memory (eDRAM).

In an embodiment, the integrated circuit 910 is complemented with a subsequent integrated circuit 911. Useful embodiments include a dual processor 913 and a dual communications circuit 915 and dual on-die memory 917 such as SRAM. In an embodiment, the dual integrated circuit 910 includes embedded on-die memory 917 such as eDRAM.

In an embodiment, the electronic system 900 also includes an external memory 940 that in turn may include one or more memory elements suitable to the particular application, such as a main memory 942 in the form of RAM, one or more hard drives 944, and/or one or more drives that handle removable media 946, such as diskettes, compact disks (CDs), digital variable disks (DVDs), flash memory drives, and other removable media known in the art. The external memory 940 may also be embedded memory 948 such as the first die in a die stack, according to an embodiment.

In an embodiment, the electronic system 900 also includes a display device 950, an audio output 960. In an embodiment, the electronic system 900 includes an input device such as a controller 970 that may be a keyboard, mouse, trackball, game controller, microphone, voice-recognition device, or any other input device that inputs information into the electronic system 900. In an embodiment, an input device 970 is a camera. In an embodiment, an input device 970 is a digital sound recorder. In an embodiment, an input device 970 is a camera and a digital sound recorder.

As shown herein, the integrated circuit 910 can be implemented in a number of different embodiments, including a package substrate having pillar structures on an optical waveguide, according to any of the several disclosed embodiments and their equivalents, an electronic system, a computer system, one or more methods of fabricating an integrated circuit, and one or more methods of fabricating an electronic assembly that includes a package substrate having pillar structures on an optical waveguide, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed package substrates having pillar structures on an optical waveguide embodiments and their equivalents. A foundation substrate may be included, as represented by the dashed line of FIG. 9. Passive devices may also be included, as is also depicted in FIG. 9.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

EXAMPLES

The following paragraphs describe examples of various embodiments.

Example 1 is an apparatus comprising: a substrate; a waveguide on a surface of the substrate; a plurality of pillar structures, wherein each of the plurality of pillar structures has a first end and a second end opposite the first end, wherein the first end of each of the plurality of pillar structures is coupled with a surface of the waveguide; and a plurality of masses, wherein each one of the plurality of masses is coupled with the second end of a corresponding one of the plurality of pillar structures.

Example 2 includes the apparatus of example 1, wherein the plurality of masses includes a selected one or more of: gold, silver, aluminum, palladium, nickel, or copper.

Example 3 includes the apparatus of examples 1 or 2, wherein the plurality of masses is not directly physically coupled with the surface of the waveguide.

Example 4 includes the apparatus of examples 1, 2, or 3, wherein each one of the plurality of masses is not in direct physical contact with any other of the plurality of masses.

Example 5 includes the apparatus of examples 1, 2, 3, or 4, wherein the substrate includes glass.

Example 6 includes the apparatus of examples 1, 2, 3, 4, or 5, wherein the plurality of pillar structures are in a grid pattern with respect to the surface of the waveguide.

Example 7 includes the apparatus of examples 1, 2, 3, 4, 5, or 6, wherein each of the plurality of pillar structures are orthogonal to the surface of the waveguide.

Example 8 includes the apparatus of examples 1, 2, 3, 4, 5, 6, or 7, further comprising a layer on the surface of the waveguide, wherein the first end of each of the plurality of pillar structures is coupled with the layer, and wherein the layer primarily comprises carbon.

Example 9 includes the apparatus of examples 1, 2, 3, 4, 5, 6, 7 or 8, wherein each of the plurality of masses has a shape that is a selected one of: a spheroid or a polyhedra.

Example 10 includes the apparatus of examples 1, 2, 3, 4, 5, 6, 7, 8 or 9, wherein the waveguide is formed using laser direct writing.

Example 11 is a package comprising: a layer of glass; a waveguide on a surface of the layer of glass; a plurality of pillar structures, wherein each of the plurality of pillar structures has a first end and a second end opposite the first end, wherein the first end of each of the plurality of pillar structures is coupled to a surface of the waveguide within a region on the surface of the waveguide; a plurality of masses, wherein each one of the plurality of masses is coupled with the second end of a corresponding one of the plurality of pillar structures; and a photonics integrated circuit (PIC) coupled with the layer of glass, wherein the PIC and the region on the surface of the waveguide are optically coupled through at least a portion of the plurality of pillar structures.

Example 12 includes the package of example 11, wherein the plurality of masses includes a selected one or more of: gold, silver, aluminum, palladium, nickel, or copper.

Example 13 includes the package of examples 11 or 12, further including a layer on the surface of the waveguide, wherein the first end of each of the plurality of pillar structures is coupled with the layer, and wherein the layer primarily comprises carbon.

Example 14 includes the package of example 13, wherein each of the plurality of masses that is coupled with the second end of a corresponding one of the plurality of pillar structures does not extend to the surface of the waveguide or to a surface of the layer.

Example 15 includes the package of examples 11, 12, 13, or 14, wherein a first mass of the plurality of masses and a second mass of the plurality of masses that is adjacent to the first mass of the plurality of masses are separated by a distance of 3 μm or less.

Example 16 includes the package of examples 11, 12, 13, 14, or 15, wherein the plurality of pillar structures are in a grid pattern with respect to the surface of the waveguide.

Example 17 includes the package of examples 11, 12, 13, 14, 15, or 16, wherein the waveguide is a first waveguide, wherein the plurality of pillar structures is a first plurality of pillar structures, wherein the plurality of masses is a first plurality of masses, and wherein the region on the surface of the waveguide is a first region; and further comprising: a second waveguide on the surface of the layer of glass; a second plurality of pillar structures, wherein each of the second plurality of pillar structures has a first end and a second end opposite the first end, wherein the first end of each of the second plurality of pillar structures is coupled to a surface of the second waveguide within a second region on the surface of the second waveguide; a second plurality of masses, wherein each one of the second plurality of masses is coupled with the second end of a corresponding one of the second plurality of pillar structures; and wherein the PIC and the second region on the surface of the second waveguide are optically coupled.

Example 18 includes the package of examples 11, 12, 13, 14, 15, 16, 17, or 18, wherein the plurality of pillar structures are in a grid pattern with respect to the surface of the waveguide.

Example 19 includes the package of examples 11, 12, 13, 14, 15, 16, 17, or 18, wherein each of the plurality of pillar structures are orthogonal to the surface of the waveguide.

Example 20 includes the package of examples 11, 12, 13, 14, 15, 16, 17, 18, or 19, further comprising a layer on the surface of the waveguide, wherein the layer primarily comprises carbon.

Example 21 includes the package of examples 11, 12, 13, 14, 15, 16, 17, 18, 19, or 20, wherein each of the plurality of masses has a shape that is a selected one of: a spheroid or a polyhedra.

Example 22 is a method comprising: identifying a glass substrate; forming a waveguide on a surface of the glass substrate; and forming a plurality of pillar structures on a surface of the waveguide, wherein the plurality of pillar structures are orthogonal to the surface of the waveguide.

Example 23 includes the method of example 22, further comprising forming a plurality of masses, wherein each one of the plurality of masses is coupled with an end of a corresponding one of the plurality of pillar structures that is distal to the surface of the waveguide.

Example 24 includes the method of example 23, wherein forming the plurality of masses further includes: applying a material to the plurality of pillar structures; and applying heat to the plurality of pillar structures.

Example 25 includes the method of example 24, wherein the material includes a selected one or more of: gold, silver, aluminum, palladium, nickel, or copper.

What is claimed is:

1. An apparatus comprising:

a substrate;

a waveguide on a surface of the substrate;

a plurality of pillar structures, wherein each of the plurality of pillar structures has a first end and a second end opposite the first end, wherein the first end of each of the plurality of pillar structures is coupled with a surface of the waveguide; and a plurality of masses, wherein each one of the plurality of masses is coupled with the second end of a corresponding one of the plurality of pillar structures, and wherein each one of the plurality of masses has a diameter greater than a diameter of the corresponding one of the plurality of pillar structures.

2. The apparatus of claim 1, wherein the plurality of masses includes a selected one or more of: gold, silver, aluminum, palladium, nickel, or copper.

3. The apparatus of claim 1, wherein the plurality of masses is not directly physically coupled with the surface of the waveguide.

4. The apparatus of claim 1, wherein each one of the plurality of masses is not in direct physical contact with any other of the plurality of masses.

5. The apparatus of claim 1, wherein the substrate includes glass.

6. The apparatus of claim 1, wherein the plurality of pillar structures are in a grid pattern with respect to the surface of the waveguide.

7. The apparatus of claim 1, wherein each of the plurality of pillar structures are orthogonal to the surface of the waveguide.

8. The apparatus of claim 1, further comprising a layer on the surface of the waveguide, wherein the first end of each of the plurality of pillar structures is coupled with the layer, and wherein the layer primarily comprises carbon.

9. The apparatus of claim 1, wherein each of the plurality of masses has a shape that is a selected one of: a spheroid or a polyhedron.

10. The apparatus of claim 1, wherein the waveguide is formed using laser direct writing.

11. A package comprising:
- a layer of glass;
- a waveguide on a surface of the layer of glass;
- a plurality of pillar structures, wherein each of the plurality of pillar structures has a first end and a second end opposite the first end, wherein the first end of each of the plurality of pillar structures is coupled to a surface of the waveguide within a region on the surface of the waveguide;
- a plurality of masses, wherein each one of the plurality of masses is coupled with the second end of a corresponding one of the plurality of pillar structures; and
- a photonics integrated circuit (PIC) coupled with the layer of glass, wherein the PIC and the region on the surface of the waveguide are optically coupled through at least a portion of the plurality of pillar structures.

12. The package of claim 11, wherein the plurality of masses includes a selected one or more of: gold, silver, aluminum, palladium, nickel, or copper.

13. The package of claim 11, further including a layer on the surface of the waveguide, wherein the layer primarily comprises carbon.

14. The package of claim 13, wherein each of the plurality of masses that is coupled with the second end of a corresponding one of the plurality of pillar structures does not extend to the surface of the waveguide or to a surface of the layer which primarily comprises carbon.

15. The package of claim 11, wherein a first mass of the plurality of masses and a second mass of the plurality of masses that is adjacent to the first mass of the plurality of masses are separated by a distance of 3 μm or less.

16. The package of claim 11, wherein the plurality of pillar structures are in a grid pattern with respect to the surface of the waveguide.

17. The package of claim 11, wherein the waveguide is a first waveguide, wherein the plurality of pillar structures is a first plurality of pillar structures, wherein the plurality of masses is a first plurality of masses, and wherein the region on the surface of the waveguide is a first region; and further comprising:
- a second waveguide on the surface of the layer of glass;
- a second plurality of pillar structures, wherein each of the second plurality of pillar structures has a first end and a second end opposite the first end, wherein the first end of each of the second plurality of pillar structures is coupled to a surface of the second waveguide within a second region on the surface of the second waveguide;
- a second plurality of masses, wherein each one of the second plurality of masses is coupled with the second end of a corresponding one of the second plurality of pillar structures; and
- wherein the PIC and the second region on the surface of the second waveguide are optically coupled.

18. The package of claim 17, wherein the plurality of pillar structures are in a grid pattern with respect to the surface of the waveguide.

19. The package of claim 11, wherein each of the plurality of pillar structures are orthogonal to the surface of the waveguide.

20. The package of claim 17, further comprising a layer on the surface of the waveguide, wherein the layer primarily comprises carbon.

21. The package of claim 11, wherein each of the plurality of masses has a shape that is a selected one of: a spheroid or a polyhedron.

22. A method comprising:
- providing a glass substrate;
- forming a waveguide on a surface of the glass substrate;
- forming a plurality of pillar structures on a surface of the waveguide, wherein the plurality of pillar structures are orthogonal to the surface of the waveguide; and
- further comprising forming a plurality of masses, wherein each one of the plurality of masses is coupled with an end of a corresponding one of the plurality of pillar structures that is distal to the surface of the waveguide, and wherein each one of the plurality of masses has a diameter greater than a diameter of the corresponding one of the plurality of pillar structures.

23. The method of claim 22, wherein forming the plurality of masses further includes:
- applying a material to the plurality of pillar structures; and
- applying heat to the plurality of pillar structures.

24. The method of claim 23, wherein the material includes a selected one or more of: gold, silver, aluminum, palladium, nickel, or copper.

25. An apparatus comprising:
- a substrate;
- a waveguide on a surface of the substrate;
- a plurality of pillar structures, wherein each of the plurality of pillar structures has a first end and a second end opposite the first end, wherein the first end of each of the plurality of pillar structures is coupled with a surface of the waveguide;
- a plurality of masses, wherein each one of the plurality of masses is coupled with the second end of a corresponding one of the plurality of pillar structures; and
- a layer on the surface of the waveguide, wherein the first end of each of the plurality of pillar structures is coupled with the layer, and wherein the layer primarily comprises carbon.

* * * * *